United States Patent [19]
Ishiguro et al.

[11] Patent Number: 4,839,685
[45] Date of Patent: Jun. 13, 1989

[54] LIGHT RECEIVING ELEMENT FOR A RANGEFINDER

[75] Inventors: Minoru Ishiguro; Minoru Takahashi, both of Saitama, Japan

[73] Assignee: Fuji Photo Film Co., Ltd., Kanagawa, Japan

[21] Appl. No.: 119,172

[22] Filed: Nov. 12, 1987

[30] Foreign Application Priority Data

Nov. 12, 1986 [JP] Japan ............................ 61-173436[U]

[51] Int. Cl.$^4$ ................................................ G03B 3/00
[52] U.S. Cl. ..................................................... 354/403
[58] Field of Search ............... 354/403, 408, 432, 481, 354/483; 250/201 AF, 204, 211 R, 211 J; 357/24 LR, 30

[56] References Cited

U.S. PATENT DOCUMENTS 4,339,185 7/1982 Nakauchi et al. .................... 354/432
4,547,074 10/1985 Hinoda et al. ................... 250/211 S Primary Examiner—L. T. Hix
Assistant Examiner—David M. Gray
Attorney, Agent, or Firm—Young & Thompson

[57] ABSTRACT

A light receiving element of a rangefinding device, for example for use in a camera, comprises a photoconversion light receiving element of which the light receiving surface is provided with a thin saw-toothed masking layer of aluminum directly deposited thereon by vacuum evaporation.

2 Claims, 3 Drawing Sheets

LIGHT RECEIVING ELEMENT FOR A RANGEFINDER

BACKGROUND OF THE INVENTION

The present invention relates to a light receiving element for use in a rangefinding device, for example in a camera.

There are already known so-called active type rangefinding devices in which light emitted in the form of a spot or a slit from a light emitting element impinges on an object whose distance is to be measured and then the light reflected from the object is focussed on a light receiving element. The light reflected from the object is focussed at a certain position on the light receiving element according to the distance at which the object is located. Therefore, the object distance can be found based on the position at which the reflected light is focussed on the light receiving element.

An example of such prior art active type rangefinding devices is shown in FIG. 1. A light emitting device 10 includes a light emitting element such as a flash lamp 11, a filter 12 for allowing infrared light to pass therethrough, and a projection lens 13. This light emitting device 10 is designed to project infrared light in the form either of a spot or of a thin line toward an object 14 whose distance is to be measured. In the case of a camera, the object 14 is to be photographed when a shutter release button is halfway depressed in a well known manner. A light receiving device 15 includes first and second light receiving units 16A and 16B arranged closely side by side each of which comprises a light receiving element 17 comprising a photoelectric conversion element, a filter 19 for allowing infrared light to pass therethrough, and a detecting lens 20. On a light receiving surface of the light receiving element 17 of either element 17, for example that of the first light receiving unit 16A in this embodiment, there is a masking filter 18 shown in greater detail in FIG. 2 which comprises a light-opaque section 18A having a saw-toothed configuration and a transparent section 18B having a complementarily saw-toothed configuration.

As the light receiving units 16A and 16B are located at predetermined different base lengths from the light emitting device 10, the reflected light from the object 14 is focussed at different positions on the light receiving elements 17 according to the object distance. The light receiving element 17 of the light receiving unit 16A emits an electric output signal A which, because of the provision of the masking filter 18, varies both with the position on the light receiving element at which the reflected light is focussed and with the intensity of the incident light.

By contrast, the light receiving element 17 of the light receiving unit 16B emits an electric output signal B that varies only with the intensity of the incident light and not with the position at which the reflected light is focussed thereon. Accordingly, based on a combination of the electric output signals A and B, for example the ratio of the electric output signals A/B, the subject distance of the object 14 can be obtained. More specifically, because of the fact that the signal ratio A/B depends not on light intensity but only on subject distance, detected signal ratios can be correspondingly converted into subject distances. In the case that such a rangefinding device is used in automatic focussing cameras, a complete depression of a shutter release button causes a focus adjustment of a taking lens according to the signal ratios.

For forming the prior art masking filter 18, a photographic film is used. Specifically, a negative film is exposed to an original pattern having a desired saw-toothed configuration and then developed to form an opaque saw-toothed pattern on the film comprising the masking filter 18. But when a negative film is used for the masking filter 18, it is impossible to have a transparent section 18B with a light transmittance of 100% and an opaque section 18A with a transmittance of zero. Instead, the light opaque and transparent sections 18A and 18B will have transmittances Td and Tc, respectively.

Moreover, in the case of utilizing a photographic film, one problem associated with the masking filter 18 is that, as is shown in FIG. 3, the saw-teeth have rounded tip ends which results from the grain size of the emulsion and the thickness of the emulsion layer on the film.

Due to these drawbacks described above, the prior art masking filter 18 has only an available range T1 of transmittance shown in FIG. 4. This means that light incident on the light receiving element 17 of the light receiving unit 16A can be by no means utilized efficiently over the entire range of 0% to 100%, and this makes it difficult to provide signal ratios A/B accurately corresponding to object distances.

OBJECT OF THE INVENTION

It is therefore an object of the present invention to provide a light receiving element of a rangefinding device, for example for use in a camera, which makes almost all incident light be efficiently utilizable.

SUMMARY OF THE INVENTION

According to the present invention, the light receiving element has a light receiving surface with a saw-toothed configuration provided by a masking layer of aluminum coated thereon.

According to a feature of a preferred embodiment of the present invention, the aluminum layer is directly coated on the light receiving surface of the light receiving element by means of vacuum evaporation to form a masking filter. As a result, the tips of the saw-teeth of the masking filter are sharp. Moreover, the aluminum layer of masking filter is completely light opaque and the portion of the light receiving surface of the light receiving element where no aluminum layer is formed can effectively utilize 100% of the light incident thereon. Therefore, the ratios between the signals from the two light receiving elements of the light receiving units of the light receiving device correspond accurately to object distances.

DETAILED DESCRIPTION OF THE INVENTION

The active type rangefinding devices in which the light receiving element according to a preferred embodiment of the present invention can be utilized incorporate various elements, in particular electric signal processing circuits; and in the particular environment of automatic focussing cameras, the devices will also incorporate control circuits and elements for adjusting the focus of the taking lens. Because such elements are well known to those skilled in the art, this description will be directed in particular to elements forming part of, or cooperating directly with the light receiving element embodying the present invention.

Figure 5:
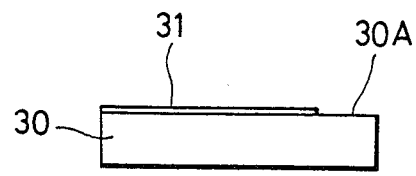
FIG. 5 is a side view of a light receiving element with a mask layer applied thereon of a preferred embodiment of the present invention.

Referring now to FIG. 5, shown therein is a light receiving element 30 comprising a photoelectric conversion element according to the present invention of which a light receiving surface 30A has a mask filter 31 of saw-tooth configuration. This mask filter 31 is a thin aluminum layer formed or coated by means of, for example, vacuum evaporation well known to those skilled in the art. For forming this saw-toothed aluminum mask filter 31, a thin aluminum layer is first formed over all the light receiving surface 30A of the light receiving element 30 by means of vacuum evaporation, to a thickness such that it is opaque, for example 1 micron and then a photo-resistive material is coated over the thin aluminum layer. Next, the light receiving surface 30A with the photo-resistive material coated thereover is exposed to light in the pattern of the desired saw-toothed configuration. After this exposure, the light receiving element 30 is dipped in a photo-etching solution to remove both the unexposed photo-resistive material and also the aluminum below it.

Any conventional positive photo-resistive material can be used, but the photo-etching solution should be of a conventional phosphate type so as to remove also the aluminum.

Figure 6:
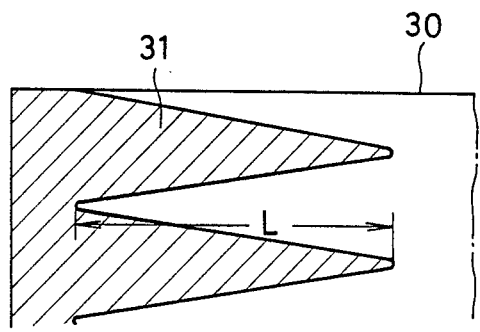
FIG. 6 is an enlarged view showing a part of the mask layer of FIG. 5.

As can be clearly seen in FIG. 6 showing a part of the light receiving element 30 on a magnified scale, because no photographic film is used to form the mask filter 31 and so the influence of a photographic emulsion layer is avoided, a sharp edge can be formed on the saw-toothed thin aluminum mask filter 31.

Figure 1:
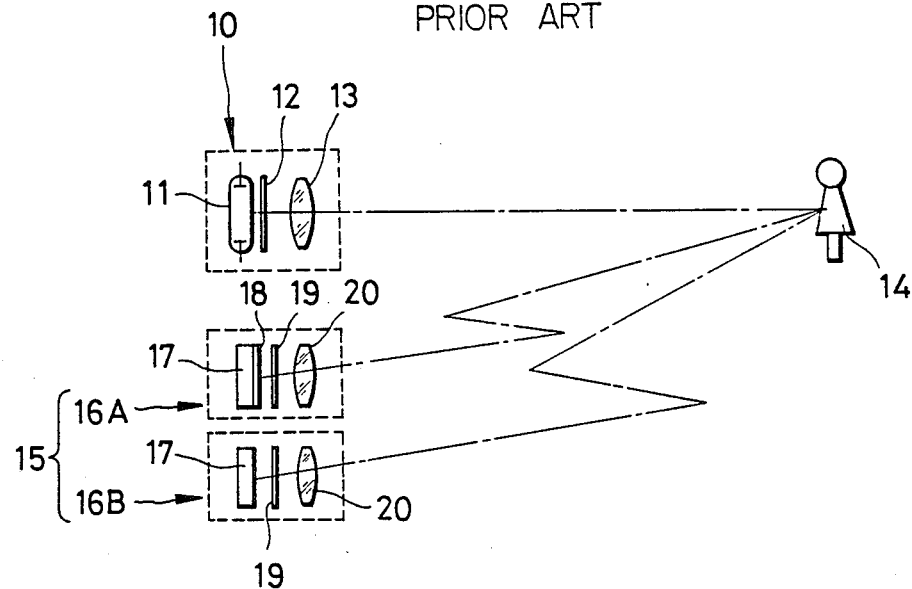
FIG. 1 is an explanatory schematic view of a prior art rangefinding device.
Figure 2:
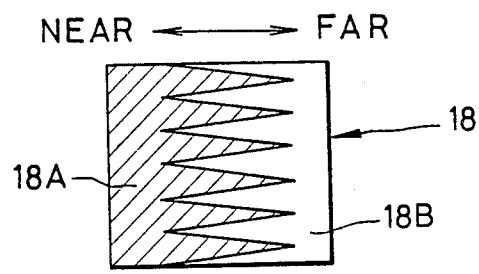
FIG. 2 is a plan view of a masking filter of the rangefinder of FIG. 1.
Figure 3:
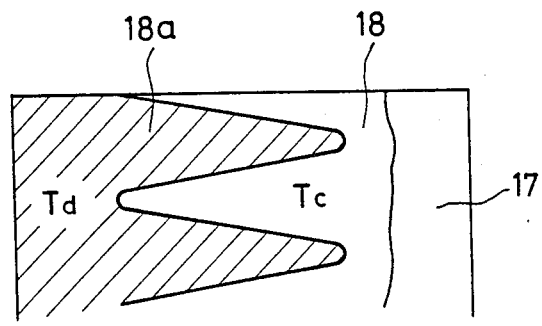
FIG. 3 is an enlarged view of a part of the masking filter of FIG. 2.
Figure 4:
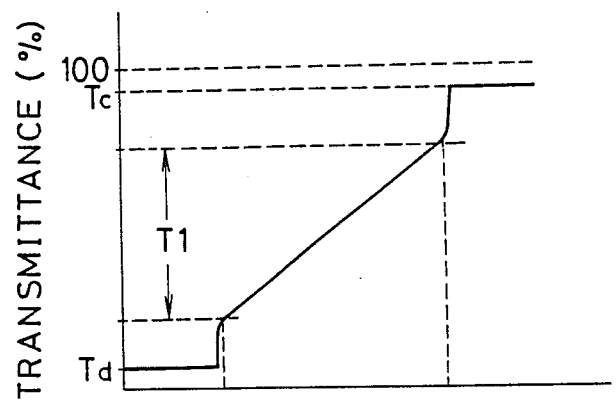
FIG. 4 is a graph showing the light transmittance of the masking filter of FIG. 2.
Figure 7:
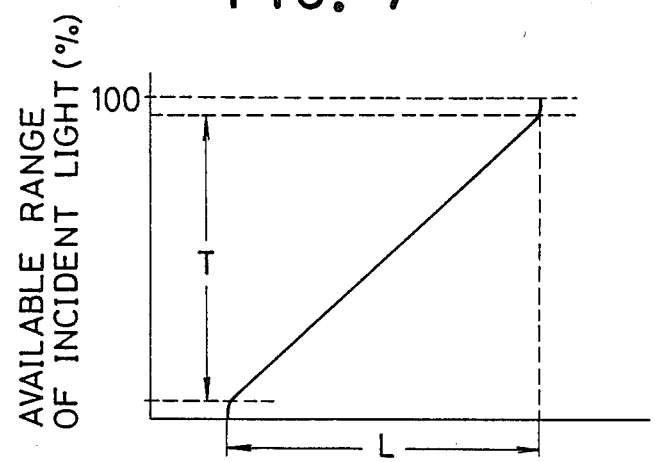
FIG. 7 is a graph showing the available range of incident light when the mask layer of FIG. 5 is used.

FIG. 7 shows the degree to which the light incident on the light receiving element 30 can be efficiently utilized and which is analogous to the transmittance of the masking filter 18 of film in the prior art light receiving element 17 as shown in FIG. 4. As is apparent from a comparison of FIGS. 4 and 7, the available range of incident light which is indicated by T is considerably widened by the present invention in comparison with the prior art light receiving element. Due to this widened available range, the signal ratio A/B corresponds more precisely to object distance.

It will be understood that various changes and modifications may be made in the form and details of the elements without departing from the scope of the invention, which generally stated, consists in the matter set forth in the accompanying claims.

What is claimed is:

1. A light receiving element for use in a rangefinding device which comprises light projecting means for projecting a light toward an object to be measured and light receiving means for receiving a light reflected from said object, said light receiving element comprising a light detecting member and a saw-toothed mask having sharp teeth, said mask comprising a thin opaque aluminum layer on a light receiving surface of said light detecting member formed directly on said light receiving surface by means of vacuum evaporation, and a layer of exposed photo-resistive material on only said aluminum layer.

2. A light receiving element as defined in claim 1, wherein said light detecting member is a photoelectric conversion element.

* * * * *